United States Patent
Dieckmann et al.

(10) Patent No.: US 10,735,955 B2
(45) Date of Patent: Aug. 4, 2020

(54) ESTABLISHING A WIRELESS CONNECTION TO A VEHICLE

(71) Applicant: WABCO GmbH, Hannover (DE)

(72) Inventors: Thomas Dieckmann, Pattensen (DE); Heiner Merten, Holle (DE); Thomas Wolf, Barsinghausen (DE)

(73) Assignee: Wabco GmbH, Hannover (DE)

( * ) Notice: Subject to any disclaimer, the term of this patent is extended or adjusted under 35 U.S.C. 154(b) by 115 days.

(21) Appl. No.: 15/327,515

(22) PCT Filed: May 22, 2015

(86) PCT No.: PCT/EP2015/001047
§ 371 (c)(1),
(2) Date: Jan. 19, 2017

(87) PCT Pub. No.: WO2016/012064
PCT Pub. Date: Jan. 28, 2016

(65) Prior Publication Data
US 2017/0156062 A1   Jun. 1, 2017

(30) Foreign Application Priority Data
Jul. 21, 2014   (DE) .................. 10 2014 010 752

(51) Int. Cl.
*H04W 12/06*   (2009.01)
*H04W 76/14*   (2018.01)
(Continued)

(52) U.S. Cl.
CPC ........ *H04W 12/06* (2013.01); *G06F 21/6227* (2013.01); *H04L 63/0876* (2013.01);
(Continued)

(58) Field of Classification Search
CPC ...... G06Q 20/102; G06Q 10/02; G07B 15/02; G06F 3/067; G06F 21/6227;
(Continued)

(56) References Cited

U.S. PATENT DOCUMENTS 7,912,597 B2 *  3/2011  Yamada ............. H04L 43/0811
                                                      701/31.4
8,180,547 B2 *  5/2012  Prasad ................... B60T 8/175
                                                      340/870.41
(Continued)

FOREIGN PATENT DOCUMENTS

CN    103594002 A  *  2/2014
CN    103594002 B  *  8/2016  ............ G08G 1/16
(Continued)

OTHER PUBLICATIONS

Security and privacy in automotive on-board networks by Hendrik Schweppe "ParisTech" Institute of Science and Technologies pp. 226, Nov. 8, 2012 (Year: 2012).*
(Continued)

*Primary Examiner* — Jeffrey C Pwu
*Assistant Examiner* — Ali H. Cheema
(74) *Attorney, Agent, or Firm* — Warner Norcross + Judd, LLP

(57) ABSTRACT

A method for establishing a wireless connection between a mobile communication device and a communication module (14) of a vehicle (10) with an identifier (17) is disclosed. According to the method, access rights, namely links between vehicle identifiers (17) and user identifiers, as well as data required for establishing the wireless connection, are stored in a database server (16) outside of the mobile communication device. A control unit (11, 12) for carrying out the method is also disclosed.

7 Claims, 1 Drawing Sheet

(51) Int. Cl.
*H04W 4/80* (2018.01)
*H04W 4/40* (2018.01)
*H04W 12/00* (2009.01)
*H04L 29/06* (2006.01)
*G06F 21/62* (2013.01)
*H04W 8/18* (2009.01)
*H04W 12/08* (2009.01)
*H04W 76/10* (2018.01)
*H04L 29/08* (2006.01)
*H04W 84/12* (2009.01)
*G08C 17/02* (2006.01)

(52) U.S. Cl.
CPC ............... *H04L 63/18* (2013.01); *H04W 4/40* (2018.02); *H04W 4/80* (2018.02); *H04W 8/183* (2013.01); *H04W 12/003* (2019.01); *H04W 12/08* (2013.01); *H04W 76/14* (2018.02); *G06F 2221/2141* (2013.01); *G08C 17/02* (2013.01); *H04L 63/101* (2013.01); *H04L 67/12* (2013.01); *H04L 67/125* (2013.01); *H04L 67/34* (2013.01); *H04W 12/00522* (2019.01); *H04W 76/10* (2018.02); *H04W 84/12* (2013.01)

(58) Field of Classification Search
CPC . G06F 2221/2141; H04L 67/12; H04L 63/06; H04L 63/0876; H04L 63/18; H04L 63/101; H04L 67/125; H04L 67/34; H04L 29/06; H04L 67/306; H04L 43/0811; H04L 12/413; H04W 12/06; H04W 76/14; H04W 4/80; H04W 84/12; H04W 8/183; H04W 12/08; H04W 76/10; H04W 4/046; H04W 4/40; H04W 12/003; F02D 29/02; G08C 17/02
USPC ...... 705/40, 50; 701/2, 22, 31.4, 1; 709/223; 726/6, 7; 455/456.1, 575.9; 340/5.64, 340/426.13, 870.41; 707/722, 736
See application file for complete search history.

(56) References Cited

U.S. PATENT DOCUMENTS

| | | | | |
|---|---|---|---|---|
| 8,751,065 B1* | 6/2014 | Kato | ................. | H04M 1/72533 340/426.13 |
| 8,971,916 B1* | 3/2015 | Joyce | ................. | G06F 3/067 455/456.1 |
| 9,499,128 B2* | 11/2016 | Reh | ................. | G06Q 50/30 |
| 2003/0171852 A1* | 9/2003 | Vollmer | ................. | H04L 29/06 701/1 |
| 2005/0197174 A1* | 9/2005 | Hasan | ................. | H04W 12/06 455/575.9 |
| 2010/0076622 A1* | 3/2010 | Dickerhoof | ............ | B60R 25/24 701/2 |
| 2010/0220250 A1* | 9/2010 | Vanderwall | ......... | G01C 21/3688 348/837 |
| 2011/0057815 A1* | 3/2011 | King | ................. | G07B 15/02 340/932.2 |
| 2011/0060480 A1* | 3/2011 | Mottla | ............... | G07C 9/00309 701/2 |
| 2011/0112969 A1* | 5/2011 | Zaid | ................. | G06Q 10/02 705/50 |
| 2012/0130891 A1* | 5/2012 | Bogaard | ............... | G06Q 20/102 705/40 |
| 2013/0069761 A1* | 3/2013 | Tieman | ............... | G07C 9/00309 340/5.64 |
| 2013/0103236 A1* | 4/2013 | Mehrgan | ................. | B60T 17/22 701/22 |
| 2013/0212659 A1* | 8/2013 | Maher | ................. | H04L 63/06 726/6 |
| 2013/0268139 A1* | 10/2013 | Endo | ................. | F02N 11/0807 701/2 |
| 2014/0200742 A1* | 7/2014 | Mauti, Jr. | ............... | F02D 29/02 701/2 |
| 2015/0015396 A1 | 1/2015 | Lunstedt et al. | | |
| 2015/0019533 A1* | 1/2015 | Moody | ................. | G06F 16/951 707/722 |
| 2015/0124597 A1* | 5/2015 | Mabuchi | ............... | H04L 12/413 370/230 |
| 2015/0281374 A1* | 10/2015 | Petersen | ................. | H04L 67/12 709/223 |
| 2015/0302667 A1* | 10/2015 | Punjabi | ................. | G07C 5/008 701/31.4 |
| 2015/0339334 A1* | 11/2015 | Hanke | ................. | H04L 67/306 707/736 |
| 2016/0173530 A1* | 6/2016 | Miyake | ................. | H04L 63/08 726/3 |

FOREIGN PATENT DOCUMENTS

| | | | | |
|---|---|---|---|---|
| DE | 102012101836 A1 | | 9/2013 | |
| DE | 102012012565 A1 | | 12/2013 | |
| DE | 102013006087 A1 | | 1/2014 | |
| JP | 2013193598 A | * | 9/2013 | ........... B06R 16/023 |
| WO | WO2011053357 A1 | | 5/2011 | |
| WO | WO2014105189 A1 | | 7/2014 | |

OTHER PUBLICATIONS

Design and Implementation of Vehicle Tracking System Using GPS/GSM/GPRS Technology and Smartphone Application SeokJu Lee, Girma Tewolde, Jaerock Kwon 2014 IEEE World Forum on Internet of Things (WF-IoT) pp. 6 (Year: 2014).*
PCT/EP2015/001047 International Search Report dated Aug. 5, 2015, 5 pages.
English language abstract and machine translation for DE102013006087 (A1) extracted from http://worldwide.espacenet.com database on Nov. 4, 2016, 15 pages.

* cited by examiner

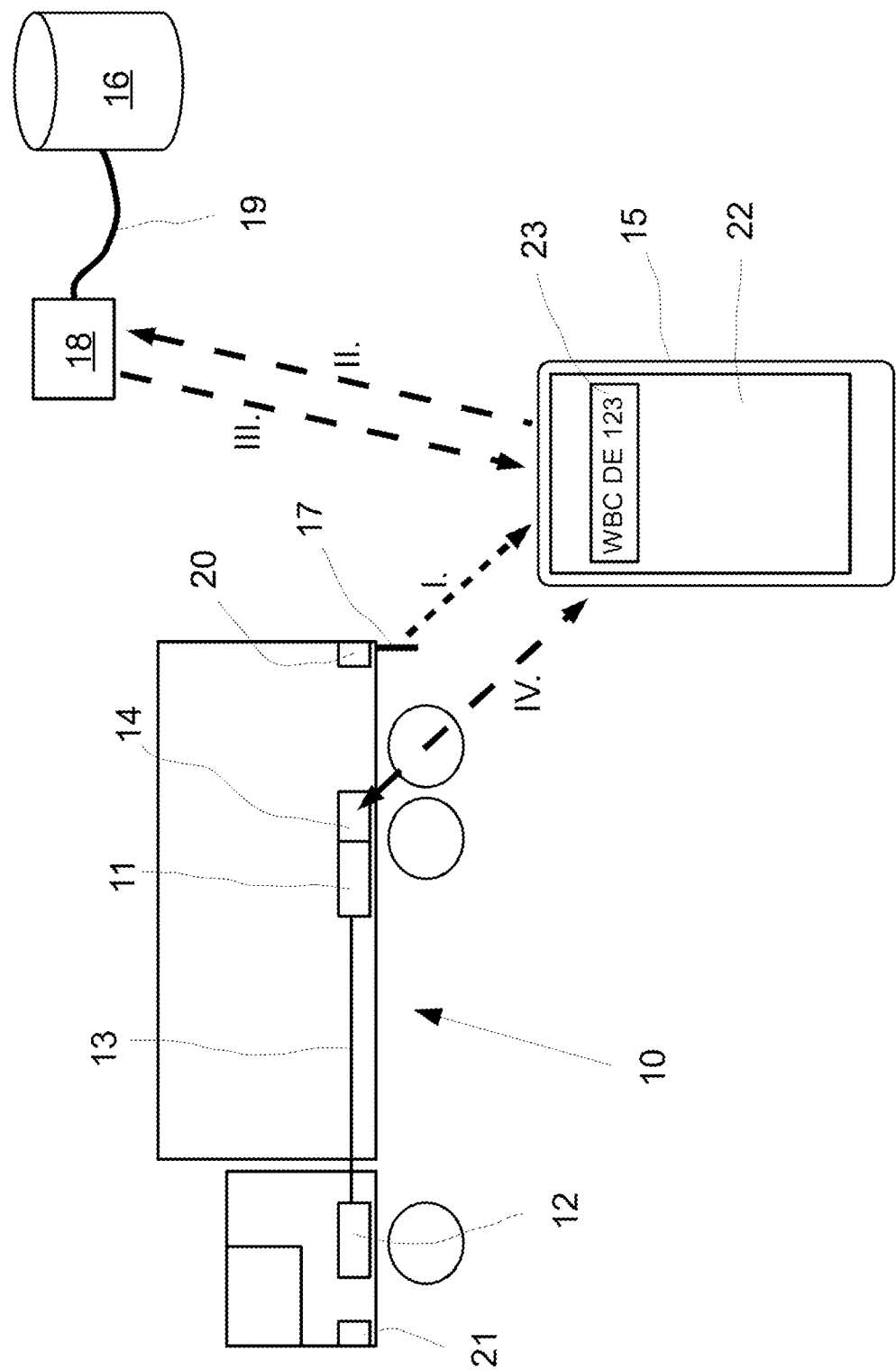

ESTABLISHING A WIRELESS CONNECTION TO A VEHICLE

CROSS-REFERENCE TO RELATED APPLICATIONS

This application is the National Stage of International Application No. PCT/EP2015/001047, filed on 22 May 2015, which claims priority to and all advantages of German Patent Application No. 10 2014 010 752.3, filed on 21 Jul. 2014, the content of which is hereby incorporated by reference.

FIELD OF THE INVENTION

The invention generally relates to a method for establishing a wireless connection and, more specifically, to a method for establishing a wireless connection between a mobile communication device and a communication module of a vehicle with an identifier, and to a control unit for a vehicle.

BACKGROUND OF THE INVENTION

Data present in a vehicle are intended to be retrievable by a user outside the vehicle. A remote control of vehicle functions by a user outside the vehicle is preferably also intended to be possible. The user has a mobile communication device available for this purpose, for example a Smartphone or a different mobile telephone. The mobile communication device communicates wirelessly with a communication module in the vehicle. The latter serves as an interface to control units in the vehicle and is part of a control unit or is connected to a control unit. The control unit is, in particular, a braking control unit which is connected to the vehicle's own data bus system (CAN bus or other) and with which functions in the vehicle are controllable. The control unit receives data from allocated sensors or via the vehicle's own data bus.

Only selected and uniquely identifiable users are intended to be able to connect via the mobile communication device to the communication module of the vehicle. An authentication is required. This is possible, for example, in that the communication module of the vehicle operates as an access point (server) for a local radio network (WLAN, IEEE-802.11 standard). The user can dial in to the local radio network with a WLAN-enabled mobile telephone provided that the user knows the data required for establishing the connection or has even already stored the data in his mobile telephone.

At a depot with a plurality of vehicles, vehicles are used progressively by different users so that the data required for establishing the radio connection remain in different mobile telephones. A user can progressively connect with his mobile telephone to the communication modules of different vehicles. Mistakes can easily occur in relation to the currently existing connection to a specific vehicle. Substantial damage can thus occur in connection with the remote control of functions of the vehicle.

Access to the communication module of a specific vehicle is intended to be configurable as easily as possible. It may thus be appropriate to allow specific connections only at specific times of the day or on specific weekdays. A unique allocation between the vehicle on the one hand and the mobile communication device on the other hand which is transparent to the user is also intended to be provided. Finally, the establishment of the connection must be as simple as possible for the user.

SUMMARY OF THE INVENTION

The method according to the invention comprises:
a) access rights, i.e. links between vehicle identifiers and user identifiers, and also data for establishing the wireless connection are stored on a (data) server outside the mobile communication device,
b) the identifier of the vehicle is recorded with the mobile communication device,
c) the user identifier is present in the mobile communication device,
d) the mobile communication device transmits the recorded vehicle identifier and the user identifier to the server,
e) the server checks whether access rights exist for the forwarded combination of identifiers,
f) if access rights exist, the server transmits the data required for establishing the wireless connection to the mobile communication unit, and
g) the mobile communication device establishes a wireless connection to the communication module of the vehicle with the data forwarded from the server.

The mobile communication device has the characteristics required to carry out the method, i.e. hardware and software for recording the vehicle identifier, hardware and software for establishing a connection to the server and hardware and software for establishing a wireless connection to the communication module of the vehicle.

Combinations of vehicle identifiers with user identifiers and the access data for the communication with the vehicle are stored in the server as datasets. If the requested combination is not stored, no connection is established between the mobile communication device and the communication module of the vehicle. In addition to the aforementioned data, further details, such as restrictions relating to the vehicle identifier and/or the user identifier, can be stored in the server. It may thus be appropriate to allow connections for specific users and/or specific vehicles only at specific times, such as specific users only during normal working hours and specific vehicles not on Sundays and public holidays.

The server can be configured by an operator of a vehicle fleet. Vehicle identifiers, user identifiers, connection data and restrictions can thus be centrally managed, adapted and updated.

In certain embodiments, a number plate, a chassis number, an optical pattern, data transmittable via RFID (Radio Frequency Identification) or data transmittable via NFC (Near Field Communication) are used as the vehicle identifier. The number plate is preferably read by the mobile communication device. The inscription on the number plate is also referred to colloquially as the vehicle registration number. Here, the vehicle identifier may actually contain different data or may be of a different type. What is important is that the identifier enables a unique allocation to the vehicle. A QR code as an optical pattern or a radio tag with data transmittable via RFID can also be used for this purpose. A vehicle identifier can also be stored in the communication model and can be readable via NFC.

In these or other embodiments, the mobile communication device reads the data representing the vehicle identifier as an optical pattern or via a radio link. The optical pattern is, for example, recordable by a camera allocated to the mobile communication device and is convertible into suitable data by software provided for this purpose.

Typically, the user identifier comprises data which are stored in the mobile communication device or are input by the user into the mobile communication device. This may involve a device ID, a SIM card number or a number stored in a file of the communication device. The user can also type an identifier into the mobile communication device in an emergency.

In certain embodiments, the mobile communication device forwards the two identifiers (vehicle identifier and user identifier) via a mobile radio link or via a WLAN to an interface connected to the server. The server is preferably addressable via the Internet or via a different network. The interface connected to the server enables wireless access to the server via a mobile radio link or via a WLAN. The server and interface may be located spatially far apart from one another.

In these or other embodiments, the wireless connection from the mobile communication device to the communication module of the vehicle is a connection via a WLAN or Bluetooth. A different digital radio technology with the facility for an encrypted connection can also be used. The communication module is intended, in particular, to be addressable by the mobile communication device as an access point or in a similar function.

Generally, a mobile telephone with a WLAN function and/or Bluetooth function is used as the mobile communication device. The mobile telephone is preferably a Smartphone with an app as software for recording the vehicle identifier, establishing the connections, displaying vehicle information and/or for the remote control of vehicle functions. The mobile telephone preferably has a camera with which the vehicle identifier is readable. The software reads the vehicle identifier from the recorded camera image and from it generates the data that are to be forwarded to the server, the data furthermore containing information relating to the user identifier.

According to certain embodiments, the vehicle emits a visually or audibly perceptible signal, e.g. a light-flashing code or a horn signal, after establishing the wireless connection between the mobile communication device and the communication module. A signal confirming the existing connection can also be displayed on a screen of the mobile communication device, additionally or alternatively to a sound signal.

The invention also provides a control unit for a vehicle, in particular for an electronic braking system, with a communication module and for use in a method according to the invention. The communication module forms part of the control unit or is connected to the control unit at least via a data line. The control unit is preferably connected to the vehicle's own data bus system (CAN bus) and can thus communicate with other control units in the vehicle.

BRIEF DESCRIPTION OF THE DRAWINGS

The invention is described in greater detail below with reference to the accompanying FIGURE, in which:

FIG. 1 shows various aspects associated with implementing a method in accordance with the present invention.

DETAILED DESCRIPTION

As shown in FIG. 1, a vehicle 10 is equipped with an electronic braking system and has a braking control unit 11 and an engine control unit 12 which is connected to a CAN bus 13. Further control units may also be provided. Sensors are allocated to the control units, the data from the sensors being processed by the control units. A communication module 14 with which a communication is possible via a radio link, e.g. via a WLAN, is allocated here to the braking control unit 11. A wireless contact to the braking control unit 11 and/or to the CAN bus 13 is possible by means of the communication module 14. The technology for the linking of CAN networks to WLAN networks is known. Interfaces are available for this purpose.

In the present example embodiment, the vehicle 10 is a motor vehicle. However, it may also be a trailer vehicle, in the simple case also only with one control unit and no CAN bus.

A user of the vehicle 10 would like to retrieve information from the vehicle and/or control functions of the vehicle 10 via his Smartphone 15. A connection with a unique allocation between the vehicle 10 and the Smartphone 15 is required, taking account of possible access right restrictions.

Datasets containing permissible combinations of vehicles 10 with Smartphones 15 are stored on a database server 16, here using a vehicle identifier 17 (number plate) on the one hand and a device number of the Smartphone 15 on the other hand. Alternatively or additionally, a SIM card number of the Smartphone 15 may form part of the dataset, and, if necessary, further identifying details. Finally, the datasets may also contain restrictions that are additionally to be taken into account, e.g. relating to the permissibly retrievable information or permissibly executable control commands and/or restrictions relating to the times of day and weekdays.

Datasets may also be provided in which, on the one hand, the vehicle identifier 17 and, on the other hand, a device-independent key (a number or password) are stored. In addition, the connection data which are valid for each communication module 14 and which are required for establishing a connection are stored on the database server.

The Smartphone 15 may be equipped with a camera (not shown) and have a WLAN function. If the user wishes to retrieve information from the vehicle 10 and/or remotely control functions with his Smartphone 15, the following authentication procedure must be performed:

Software in the form of an app is installed on the Smartphone 15 to guide the user through the authentication procedure and carry out the steps automatically, insofar as this is possible. First, the software prompts the user to record the vehicle identifier 17 with the camera of the Smartphone 15 (step I.). The read identifier is converted by the software into a character string and is forwarded together with the device number of the Smartphone 15 via a mobile radio link (step II.) to a transceiver station 18 and from there via the Internet (number 19) to the server 16. The forwarded dataset is matched with the existing data in the server 16. If the connection is permitted, the server 16 transmits its response (step III.) back to the Smartphone 15. The response of the server 16 contains all data necessary for establishing a WLAN connection, the WLAN network name (SSID), encryption type and password. With the data, the software of the Smartphone 15 automatically establishes the WLAN connection (step IV.) to the communication module 14. The latter performs the function of an access point (server) in the WLAN network. The WLAN connection is then set up, the retrieval of information from the vehicle 10 and, if necessary, the remote control of functions are possible.

To confirm the successfully established WLAN connection to the vehicle, the latter can emit visually or audibly perceptible signals. In the present case, flashing lights 20, 21 are briefly activated. Furthermore, a textual confirmation, for example a reproduction 23 of the vehicle identifier 17, appears on a screen 22 of the Smartphone 15.

Instead of a WLAN connection, a different radio technology can also be used, such as Bluetooth, or a different technology which enables an, in particular, encrypted connection.

With the method according to the invention, the user can establish a secure and unique connection to the control unit of his vehicle in a simple manner with his Smartphone. Only an additional connection to a database server on the Internet is required for authentication and for forwarding the connection data. This additional connection is established here via a mobile radio link (GSM, UMTS, LTE, etc.). However, a different connection type, e.g. via a WLAN to a WLAN router in the vicinity, is also possible.

What is claimed is:

1. A method for establishing a wireless connection between a mobile communication device and a communication module of a vehicle with an identifier comprising:
   providing a server outside the mobile communication device, the server including access rights between vehicle identifiers and user identifiers, and connection data required for establishing the wireless connection,
   recording with the mobile communication device the identifier of the vehicle, wherein the vehicle identifier comprises a number plate or a chassis number and is determined by the mobile communication device from an optical pattern or a radio link associated with the vehicle, wherein the user identifier is present in the mobile communication device,
   transmitting by the mobile communication device to the server the vehicle identifier and the user identifier,
   checking by the server whether access rights exist for the transmitted combination of identifiers,
   if access rights exist for the transmitted combination of identifiers, transmitting by the server the connection data required for establishing the wireless connection to the mobile communication device, the connection data including identifying information for a WLAN associated with the communications module of the vehicle including a WLAN name, encryption type, and password,
   in response to the transmission of the connection data to the mobile communication device, establishing a wireless connection to the communication module from the mobile communications device over the WLAN, wherein the communications module forms part of an electronic braking system and is an access point for the WLAN, and
   emitting by the vehicle a visually or audibly perceptible signal after establishing the wireless connection between the mobile communication device and the communication module.

2. The method as claimed in claim 1, wherein the user identifier comprises data which are stored in the mobile communication device.

3. The method as claimed in claim 1, wherein the mobile communication device forwards the two identifiers via a mobile radio link or via the WLAN to an interface connected to the server.

4. The method as claimed in claim 1, wherein the wireless connection from the mobile communication device to the communication module is a connection via the WLAN.

5. The method as claimed in claim 1, wherein the mobile communication device comprises a mobile telephone with the WLAN function.

6. The method as claimed in claim 1 further comprising inputting by the user in the mobile communication device data associated with the user identifier.

7. The method as claimed in claim 1, wherein the radio link is a short-range radio link.

* * * * *